United States Patent
Li et al.

(10) Patent No.: US 12,302,342 B2
(45) Date of Patent: May 13, 2025

(54) ACQUISITION AND TRANSMISSION OF HYBRID AUTOMATIC REPEAT REQUEST ACKNOWLEDGEMENT FEEDBACK, TERMINAL AND NETWORK SIDE DEVICE

(71) Applicant: VIVO MOBILE COMMUNICATION CO., LTD., Dongguan (CN)

(72) Inventors: Can Li, Dongguan (CN); Xiaodong Shen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 394 days.

(21) Appl. No.: 17/700,311

(22) Filed: Mar. 21, 2022

(65) Prior Publication Data
US 2022/0210775 A1    Jun. 30, 2022

Related U.S. Application Data

(63) Continuation of application No. PCT/CN2020/117067, filed on Sep. 23, 2020.

(30) Foreign Application Priority Data

Sep. 27, 2019 (CN) .......................... 201910927901.8

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 5/0055* (2013.01); *H04W 76/27* (2018.02)

(58) Field of Classification Search
CPC ... H04W 72/20; H04W 72/23; H04W 72/231; H04W 72/232; H04W 72/044;
(Continued)

(56) References Cited

U.S. PATENT DOCUMENTS

2012/0218963 A1    8/2012  Kim et al.
2018/0020479 A1*   1/2018  Harada ............... H04W 74/006
(Continued)

FOREIGN PATENT DOCUMENTS

CN    102083229 A    6/2011
CN    102415039 A    4/2012
(Continued)

OTHER PUBLICATIONS

International Search Report issued in corresponding International Application No. PCT/CN2020/117067, mailed Dec. 4, 2020, 4 pages.
(Continued)

*Primary Examiner* — Peter Chen
(74) *Attorney, Agent, or Firm* — IPX PLLC (57) ABSTRACT

The present disclosure provides acquisition and transmission of an HARQ-ACK feedback, a terminal and a network side device. The acquisition method includes: acquiring target Downlink Control Information (DCI), where the target DCI is used to indicate Downlink Feedback Information (DFI), the DFI includes control information blocks respectively corresponding to N carriers of K terminals, and the control information blocks include HARQ-ACK feedbacks of the corresponding carriers.

16 Claims, 4 Drawing Sheets

(51) Int. Cl.
*H04L 5/00* (2006.01)
*H04W 76/27* (2018.01)

(58) Field of Classification Search
CPC ......... H04W 72/0446; H04W 72/0453; H04W 74/0808; H04W 76/27; H04L 1/1812; H04L 1/1822; H04L 1/1864; H04L 1/1896; H04L 5/0055
See application file for complete search history.

(56) References Cited

U.S. PATENT DOCUMENTS

| | | | |
|---|---|---|---|
| 2019/0159074 A1 | 5/2019 | Velev et al. | |
| 2019/0159256 A1 | 5/2019 | Talarico et al. | |
| 2019/0166621 A1 | 5/2019 | Yerramalli et al. | |
| 2019/0222356 A1 | 7/2019 | Zhang et al. | |
| 2019/0246391 A1 | 8/2019 | Zhang et al. | |
| 2021/0050947 A1* | 2/2021 | Tsai | H04W 72/23 |
| 2022/0069950 A1* | 3/2022 | Nunome | H04L 1/1861 |
| 2022/0174523 A1* | 6/2022 | Liu | H04L 1/1854 |
| 2022/0303069 A1* | 9/2022 | Lin | H04L 1/1864 |

FOREIGN PATENT DOCUMENTS

| | | |
|---|---|---|
| CN | 107771400 A | 3/2018 |
| CN | 108521320 A | 9/2018 |
| CN | 109391422 A | 2/2019 |
| CN | 110535565 A | 12/2019 |
| CN | 110958085 A | 4/2020 |

OTHER PUBLICATIONS

Huawei et al., "Remaining issues for AUL HARQ operation", 3GPP TSG RAN WG1 Meeting #91 R1-1719499, Dec. 1, 2017.

First Office Action issued in related Chinese Application No. 201910927901.8, mailed Aug. 18, 2021, 9 pages.

Second Office Action issued in related Chinese Application No. 201910927901.8, mailed Jan. 12, 2022, 6 pages.

Extended European Search Report issued in related European Application No. 20869620.3, mailed Oct. 19, 2020, 11 pages.

Huawei et al "Transmission with configured grant in NR unlicensed band", 3GPP TSG RAN WG1 Meeting#97, R1-1906047, May 2019, 22 pages.

ZTE et al."Discussion on configured grant for NR-U", 3GPP TSG RAN WG1 Meeting#98, R1-1908208, Aug. 2019, 8 pages.

Nokia, "Work Item on Enhancements to LTE operation in unlicensed spectrum", 3GPP TSG RAN Meeting#79, RP-180362, Mar. 2018, 12 pages.

LG Electronics, "HARQ operation for autonomous UL access", 3GPP TSG RAN WG1 Meeting#91, R1-1719864, Nov. 2017.

* cited by examiner

ACQUISITION AND TRANSMISSION OF HYBRID AUTOMATIC REPEAT REQUEST ACKNOWLEDGEMENT FEEDBACK, TERMINAL AND NETWORK SIDE DEVICE

CROSS-REFERENCE TO RELATED APPLICATIONS

This application is a continuation of International Application No. PCT/CN2020/117067, filed Sep. 23, 2020, which claims priority to Chinese Patent Application No. 201910927901.8, filed Sep. 27, 2019. The entire contents of each of the above-identified applications are expressly incorporated herein by reference.

TECHNICAL FIELD

The present disclosure relates to the technical field of communication, and in particular, to acquisition and transmission of an HARQ-ACK feedback, a terminal, and a network side device.

BACKGROUND

Autonomous UpLink access (AUL) in a 5G communication system is also called Configured Grant (CG). In Licensed-Assisted Access (LAA), a Downlink Control Information (DCI) format 0A is used to indicate AUL Downlink Feedback Information (DFI) to a terminal that has activated AUL transmission. The DCI format 0A is scrambled by an AUL Radio Network Temporary Identity (RNTI), including the bit contents:

carrier indication, 0 bit or 3 bits;

1-bit AUL distinguishing mark, "1" representing indicating AUL-DFI, and "0" representing indicating AUL to activate and deactivate;

a Hybrid Automatic Repeat Request ACKnowledgment (HARQ-ACK) bitmap, 16 bits, "1" of each bit representing ACK (ACKnowledgment), and "0" representing NACK (Negative ACKnowledgement); and a Transmit Power Control (TPC) command, 2 bits.

NewRadio (NR) specifies that DFI may be reused to carry feedback of HARQ-ACK.

In LAA, in a case that the same carrier is scheduled and mapped to the same search space, the bit number of the DCI format 0A is less than that of a DCI format 1A (including filling 0 bit), the format 0A needs to fill 0 until the bit number is the same as that of the format 1A. The bit number of the DCI format 1A may be 56 bits, and may include HARQ-ACK bitmap of at least three carriers. At this time, in a case that the HARQ-ACK design that each DFI of AUL includes 16 bits is followed, there are at least 32 bits needing to fill 0, so that a control signaling has high overhead and low utilization rate. Similarly, there will be the same problem on NR. Since it is necessary to perform LBT (Listen Before Talk) to acquire a channel on an unlicensed spectrum before transmission, this design needs to transmit the control signaling for several times separately, and it is necessary to perform LBT to acquire the channel for each transmission of the control signaling.

SUMMARY

Embodiments of the present disclosure provide acquisition and transmission of an HARQ-ACK feedback, a terminal, and a network side device, so as to solve the problems in the related art that the control signaling has high overhead and low utilization rate caused by the mode of reusing DFI to carry the HARQ-ACK feedback.

Some embodiments of the present disclosure provide: an acquisition method of a Hybrid Automatic Repeat Request Acknowledgment (HARQ-ACK) feedback, applied to a terminal. The method includes:

acquiring target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

Some embodiments of the present disclosure further provide a transmission method of a hybrid automatic repeat request acknowledgment (HARQ-ACK) feedback, applied to a network side. The method includes:

transmitting target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

Some embodiments of the present disclosure further provide a terminal, including:

an acquisition module, configured to acquire target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

Some embodiments of the present disclosure further provide a terminal, including a processor, a memory, and a computer program stored in the memory and capable of running on the processor, when the computer program is executed by the processor, steps of the above acquisition method of the hybrid automatic repeat request acknowledgment (HARQ-ACK) feedback are implemented.

Some embodiments of the present disclosure further provide a network side device, including:

a transmitting module, configured to transmit target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

Some embodiments of the present disclosure further provide a network side device, including a processor, a memory, and a computer program stored in the memory and capable of running on the processor, when the computer program is executed by the processor, steps of the above transmission method of the hybrid automatic repeat request acknowledgment (HARQ-ACK) feedback are implemented.

Some embodiments of the present disclosure further provide a non-transitory computer-readable storage medium that stores a computer program, and when the computer program is executed by a processor, steps of the above acquisition method of the hybrid automatic repeat request acknowledgment (HARQ-ACK) feedback are implemented; or when the computer program is executed by a processor, steps of the above transmission method of the hybrid automatic repeat request acknowledgment (HARQ-ACK) feedback are implemented.

In some embodiments of the present disclosure, the target DCI indicates the DFI, the DFI includes the control information blocks respectively corresponding to each carrier of K terminals, and the control information blocks include the HARQ-ACK feedbacks of the corresponding carriers, so that one DFI may include a plurality of HARQ-ACK feedbacks, the channel access opportunities are fully used, and the overhead of the control signaling is saved.

BRIEF DESCRIPTION OF DRAWINGS

In order to describe the technical solution of the embodiments of the present disclosure more clearly, the accompanying drawings required for describing the embodiments of the present disclosure will be simply introduced below. Obviously, the accompanying drawings described below merely illustrate some embodiments of the present disclosure. Those of ordinary skill in the art may also derive other accompanying drawings from these accompanying drawings.

DETAILED DESCRIPTION

The following clearly describes the technical solutions in some embodiments of the present disclosure with reference to the accompanying drawings in some embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

In some embodiments of the present disclosure, the word such as "exemplary" or "for example" is used to represent giving an example, an illustration, or a description. Any embodiment or design scheme described as "exemplary" or "for example" in some embodiments of the present disclosure should not be explained as being more preferred or having more advantages than other embodiments or design schemes. To be precise, the use of term such as "exemplary" or "for example" is intended to present a related concept in a specific manner.

Figure 1:
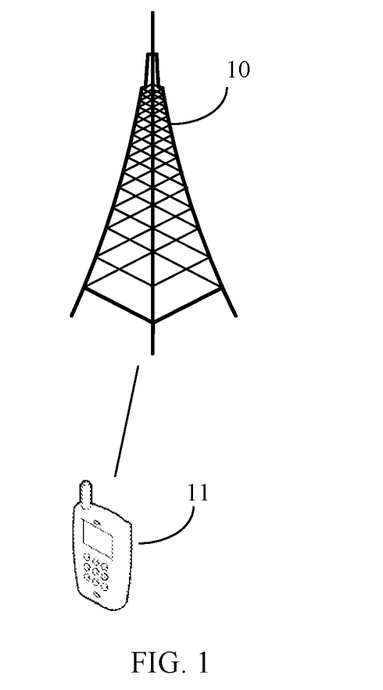
FIG. 1 is a schematic architectural diagram of a wireless communication system according to some embodiments of the present disclosure.

The embodiments of the present disclosure are described below with reference to the accompanying drawings. The acquisition and transmission of the HARQ-ACK feedback, the terminal and the network side device provided by some embodiments of the present disclosure may be applied to a wireless communication system. The wireless communications system may be a 5G system, an evolved Long-Term Evolution (eLTE) system, or a subsequent evolved communications system. FIG. 1 is a schematic architectural diagram of a wireless communications system according to some embodiments of the present disclosure. As shown in FIG. 1, the wireless communications system may include: a network side device 10 and a terminal (the terminal may be alternatively referred to as a user side device). For example, the terminal is denoted as UE 11, and the UE 11 may be connected to the network side device 10. In actual application, a connection between the devices is a wireless connection. For ease of visually indicating a connection relationship between the devices, a solid line is used for illustration in FIG. 1.

It should be noted that the communications system may include a plurality of UE, and the network side device may communicate (transmit signaling or data) with the plurality of UE.

The network side device 10 provided by some embodiments of the present disclosure may be a base station. The base station may be a commonly used base station, or may also be an evolved node base station (eNB); and the network side device 10 may also be a network side device (for example, a next-generation node base station (gNB) or a transmission and reception point (TRP)) or a cell in a 5G system.

A terminal provided by some embodiments of the present disclosure may be a mobile phone, a tablet computer, a laptop computer, an ultra-mobile personal computer (UMPC), a netbook, a wearable device, an in-vehicle device, a personal digital assistant (PDA), or the like. It should be noted that a specific type of the terminal is not limited in some embodiments of the present disclosure. In some embodiments of the present disclosure, LTE and NR systems are used as examples, but the present disclosure is not limited to these systems. The technical solutions provided by the present disclosure can be applied to other systems with the same problems.

Figure 2:
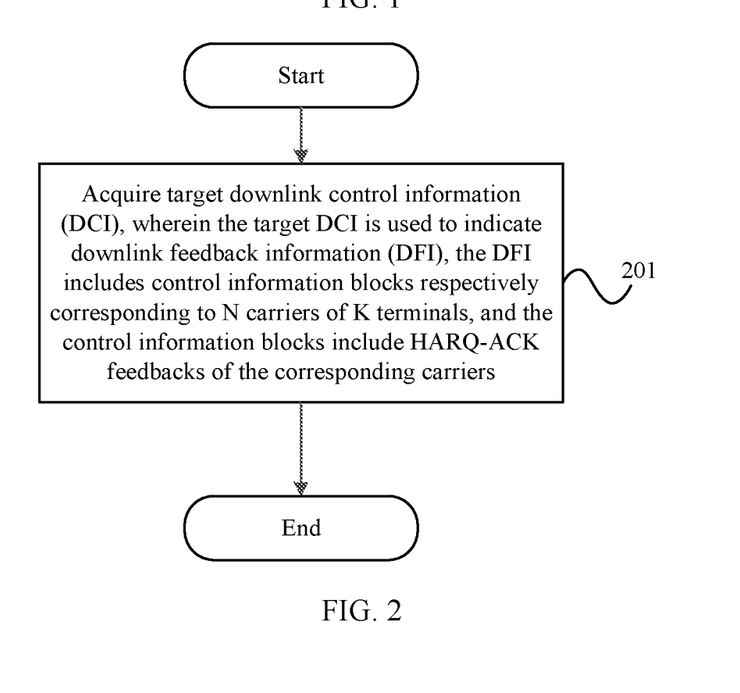
FIG. 2 is a flowchart of steps of an acquisition method of an HARQ-ACK feedback according to some embodiments of the present disclosure.

As shown in FIG. 2, some embodiments of the present disclosure provide an acquisition method of a hybrid automatic repeat request acknowledgment (HARQ-ACK) feedback, applied to a terminal. The method includes:

Step 201: acquiring target downlink control information (DCI). The target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1. In some embodiments, N is greater than or equal to K.

Some embodiments of the present disclosure aim at the multi-carrier scheduling case, then one terminal includes a plurality of carriers. The DFI includes control information blocks respectively corresponding to each carrier of K terminals, and the control information blocks are used to carry the HARQ-ACK feedbacks of the corresponding carriers. For example, the carrier of carrier aggregation of the terminal A includes a carrier 1, a carrier 2 and a carrier 3; the carrier of carrier aggregation of the terminal B includes a carrier 4 and a carrier 5; then the method provided by some embodiments of the present disclosure is applied to the terminal A, and the DFI indicated by the target DCI acquired by the terminal A may include: a control information block 1 corresponding to the carrier 1 of the terminal A, a control information block 2 corresponding to the carrier 2 of the terminal A and a control information block 3 corresponding to the carrier 3 of the terminal A; or the DFI indicated by the target DCI acquired by the terminal A may include: a control information block 1 corresponding to the carrier 1 of the terminal A, a control information block 2 corresponding to the carrier 2 of the terminal A, a control information block 3 corresponding to the carrier 3 of the terminal A, a control information block 4 corresponding to the carrier 4 of the terminal B, and a control information block 5 corresponding to the carrier 5 of the terminal B.

In a word, the DFI indicated by the target DCI acquired by the terminal at least includes a control information block corresponding to at least one carrier of this terminal, and further may include a control information block corresponding to at least one carrier of other terminals.

It should be noted that the control information blocks (that is, the number of the terminals) corresponding to carriers of several terminals included in the DFI, and the control information blocks corresponding to several carriers (that is, the number of the carriers included in the terminal) of the terminal included in the DFI are agreed by a protocol, or are determined by a network side device, and may be informed to the terminal through RRC configuration or DCI indication.

For example, the $M^{th}$ terminal has HARQ-ACK feedbacks of M_N carriers, the HARQ-ACK feedback of each carrier occupies Z bits, and Z is a fixed bit number.

As an optional embodiment, the position of the HARQ-ACK feedback of each carrier in the DFI may be indicated through the following two modes:

Mode 1: configured by RRC, that is, before step 201, the method further includes:

acquiring radio resource control (RRC) configuration information, where the RRC configuration information is used to indicate the position of the HARQ-ACK of at least one carrier in the DFI. The position of the HARQ-ACK feedback of the carrier in the DFI specifically refers to the bit start position of the HARQ-ACK feedback of the carrier in the DFI.

In some embodiments, the control information block further includes:

a first indicating field, used to indicate whether the HARQ-ACK feedback of the carrier included in the control information block is valid.

In some embodiments, the RRC configuration information includes:

a plurality of mapping elements, each mapping element including: a carrier ID, and a position of the HARQ-ACK feedback of a carrier identified by the carrier ID in the DFI, that is, the RRC configuration information configures the position of the HARQ-ACK feedback of each carrier of each terminal in the DFI; or a mapping element, the mapping element including: an ID of a first carrier of carrier aggregation, and a position of the HARQ-ACK feedback of the first carrier in the DFI, that is, the RRC configuration information only configures the position of the HARQ-ACK feedback of the first carrier of each terminal in the DFI, and the position of the HARQ-ACK feedback of the subsequent carrier in the DFI may be determined according to a predefined rule, for example, HARQ-ACK feedback is performed according to the ID sequence of the carriers.

In this mode, step 201 includes:

determining a carrier identified by the mapping element included in the RRC configuration information; and performing blind detection on the target DCI in a search space of the identified carrier.

Due to pre-configuration of the RRC configuration information, the terminal may learn the DFI includes the HARQ-ACK feedbacks of which carriers of the terminal; therefore, the terminal performs blind detection on the target DCI in the search space of the carrier identified by the mapping element included in the RRC configuration information.

The control information block includes a carrier indicator field (Carrier Indicator Field, also called carrier indicating field), where the CIF is used to indicate the ID of the carrier corresponding to the control information block. The bit number of the CIF is fixed. For example, no matter the carrier is self-scheduling or cross-carrier scheduling, the bit number of the CIF is fixed to be 3.

It should be noted that since a large number of bits are required for the CIF to directly indicate the ID of the carrier, in some embodiments of the present disclosure, the CIF may not directly indicate the ID of the carrier and indication may be assisted by the RRC configuration, for example, the network side device configures a group of mapping elements in the RRC, and each group of mapping elements is the ID of the carrier and the value of the CIF.

The DFI further includes:

a second indicating field, used to indicate the number M_N of the carriers with the HARQ-ACK feedbacks.

The method further includes:

according to the number M_N of carriers indicated by the second indicating field, CIF size (CIF size) in the DFI and HARQ-ACK size per carrier (HARQ-ACK size per carrier), determining the valid bit number of the HARQ-ACK feedback in the DFI; and demodulating the HARQ-ACK feedback of the carrier within the valid bit number of the DFI.

The valid bit number of the HARQ-ACK feedback in the DFI=M_N*(CIF size+HARQ-ACK size).

Or in a case that the DFI does not include the second indicating field, the ID of the carrier is indicated according to the ID sequence of the CIF in the control information block so as to indicate the HARQ-ACK feedback of the carrier, for example, an arrangement is performed according to (CIF #1, HARQ-ACK for CIF #1), (CIF #2, HARQ-ACK for CIF #2) . . . .

In this case, the control information block further includes a first indicating field, and the first indicating field is used to indicate whether the HARQ-ACK feedback of the carrier included in the control information block is valid; or in a case that the first carrier does not have the HARQ-ACK feedback, the control information block of the first carrier is used to carry the HARQ-ACK feedbacks of other carriers.

In this mode, step 201 includes:

the terminal performs blind detection on the target DCI in a search space of the scheduled carrier.

In some embodiments, the control information block further includes: transmit power control (TPC) of the carrier.

As an optional embodiment, some embodiments of the present disclosure further define an RNTI for demodulating the target DCI. Correspondingly, the method further includes:

demodulating the target DCI by a dedicated radio network temporary identity (RNTI) of the terminal or a public RNTI of a terminal group, where the target DCI is indicated by a specific RNTI to indicate DFI; or the target DCI is indicated by a third indicating field of the target DCI whether to indicate DFI.

In some embodiments, the third indicating field may be an existing indicating field, but in a case that the target DCI is used to indicate the DFI, the filling value of the third indicating field is a value not used for other indications; or the third indicating field is a newly added indicating field.

In other words, the RNTI for demodulating the target DCI may be a dedicated RNTI of the terminal, or may also be a public RNTI of a terminal group.

For the dedicated RNTI of the terminal, there are two cases: the existing RNTI is reused, a target field of the target DCI carriers the preset identity to indicate the target DCI for indicating the DFI; or a new RNTI is defined, and the target DCI is indicated by the specific RNTI for indicating the DFI.

The public RNTI of the terminal group includes: a new RNTI is defined, and the target DCI is indicated by the specific RNTI for indicating the DFI.

It should be noted that in a case that the new RNTI is defined (that is, the target DCI is indicated by the specific RNTI for indicating the DFI), the size of the target DCI is aligned with the size of the DCI for indicating other information except the DFI. In other words, the size of the target DCI is aligned with the size of the existing DCI, for example, when the size of the DCI is small, alignment may be realized by filling 0 bit.

In conclusion, in some embodiments of the present disclosure, the target DCI indicates the DFI, the DFI includes the control information blocks respectively corresponding to each carrier of K terminals, and the control information blocks include the HARQ-ACK feedbacks of the corresponding carriers, so that one DFI may include a plurality of HARQ-ACK feedbacks, the channel access opportunities are fully used, and the overhead of the control signaling is saved.

Figure 3:
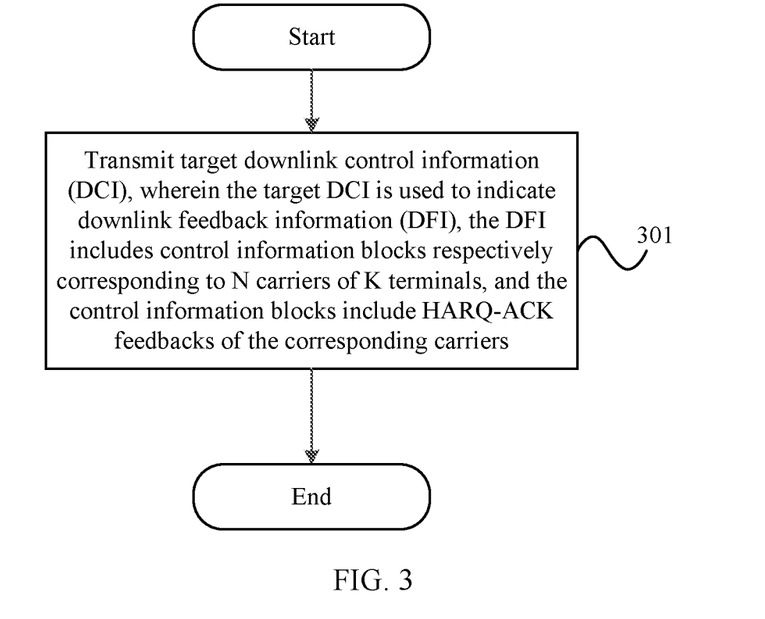
FIG. 3 is a flowchart of steps of a transmitting method of an HARQ-ACK feedback according to some embodiments of the present disclosure.

As shown in FIG. 3, some embodiments of the present disclosure further provide a transmission method of a hybrid automatic repeat request acknowledgment (HARQ-ACK) feedback, applied to a network side. The method includes:

Step 301: transmitting target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

Some embodiments of the present disclosure aim at the multi-carrier scheduling case, then one terminal includes a plurality of carriers. The DFI includes control information blocks respectively corresponding to each carrier of K terminals, and the control information blocks are used to carry the HARQ-ACK feedbacks of the corresponding carriers. For example, the carrier of carrier aggregation of the terminal A includes a carrier 1, a carrier 2 and a carrier 3; the carrier of carrier aggregation of the terminal B includes a carrier 4 and a carrier 5; then the method provided by some embodiments of the present disclosure is applied to the terminal A, and the DFI indicated by the target DCI acquired by the terminal A may include: a control information block 1 corresponding to the carrier 1 of the terminal A, a control information block 2 corresponding to the carrier 2 of the terminal A and a control information block 3 corresponding to the carrier 3 of the terminal A; or the DFI indicated by the target DCI acquired by the terminal A may include: a control information block 1 corresponding to the carrier 1 of the terminal A, a control information block 2 corresponding to the carrier 2 of the terminal A, a control information block 3 corresponding to the carrier 3 of the terminal A, a control information block 4 corresponding to the carrier 4 of the terminal B, and a control information block 5 corresponding to the carrier 5 of the terminal B.

In a word, the DFI indicated by the target DCI acquired by the terminal at least includes a control information block corresponding to at least one carrier of this terminal, and further may include a control information block corresponding to at least one carrier of other terminals.

It should be noted that the control information blocks (that is, the number of the terminals) corresponding to carriers of several terminals included in the DFI, and the control information blocks corresponding to several carriers (that is, the number of the carriers included in the terminal) of the terminal included in the DFI are agreed by a protocol, or are determined by a network side device, and may be informed to the terminal through RRC configuration or DCI indication.

For example, the $M^{th}$ terminal has HARQ-ACK feedbacks of M_N carriers, the HARQ-ACK feedback of each carrier occupies Z bits, and Z is a fixed bit number.

As an optional embodiment, the position of the HARQ-ACK feedback of each carrier in the DFI may be indicated through the following two modes:

Mode 1: configured by RRC, that is, before step 301, the method further includes:

transmitting radio resource control (RRC) configuration information, where the RRC configuration information is used to indicate the position of the HARQ-ACK of at least one carrier in the DFI. The position of the HARQ-ACK feedback of the carrier in the DFI specifically refers to the bit start position of the HARQ-ACK feedback of the carrier in the DFI.

In some embodiments, the control information block further includes:

a first indicating field, used to indicate whether the HARQ-ACK feedback of the carrier included in the control information block is valid.

In some embodiments, the RRC configuration information includes:

a plurality of mapping elements, each mapping element including: a carrier ID, and a position of the HARQ-ACK feedback of a carrier identified by the carrier ID in the DFI, that is, the RRC configuration information configures the position of the HARQ-ACK feedback of each carrier of each terminal in the DFI;

or a mapping element, the mapping element including: an ID of a first carrier of carrier aggregation, and a position of the HARQ-ACK feedback of the first carrier in the DFI, that is, the RRC configuration information only configures the position of the HARQ-ACK feedback of the first carrier of each terminal in the DFI, and the position of the HARQ-ACK feedback of the subsequent carrier in the DFI may be determined according to a predefined rule, for example, HARQ-ACK feedback is performed according to the ID sequence of the carriers.

Mode 2: the position of the carrier is indicated by the CIF, that is, the control information block includes a carrier indicator field (CIF), where the CIF is used to indicate an ID of the carrier corresponding to the control information block. The bit number of the CIF is fixed. For example, no matter the carrier is self-scheduling or cross-carrier scheduling, the bit number of the CIF is fixed to be 3.

It should be noted that since a large number of bits are required for the CIF to directly indicate the ID of the carrier, in some embodiments of the present disclosure, the CIF may not directly indicate the ID of the carrier and indication may be assisted by the RRC configuration, for example, the network side device configures a group of mapping elements in the RRC, and each group of mapping elements is the ID of the carrier and the value of the CIF.

The DFI further includes:

a second indicating field, used to indicate the number M_N of the carriers with the HARQ-ACK feedbacks.

Or in a case that the DFI does not include the second indicating field, the ID of the carrier is indicated according to the ID sequence of the CIF in the control information block so as to indicate the HARQ-ACK feedback of the carrier, for example, an arrangement is performed according to (CIF #1, HARQ-ACK for CIF #1), (CIF #2, HARQ-ACK for CIF #2) . . . .

In this case, the control information block further includes a first indicating field, and the first indicating field is used to indicate whether the HARQ-ACK feedback of the carrier included in the control information block is valid; or in a case that the first carrier does not have the HARQ-ACK feedback, the control information block of the first carrier is used to carry the HARQ-ACK feedbacks of other carriers.

In some embodiments, the control information block further includes: transmit power control (TPC) of the carrier.

As an optional embodiment, some embodiments of the present disclosure further define an RNTI for demodulating the target DCI. Correspondingly, step 301 includes:

scrambling and transmitting the target DCI by a dedicated radio network temporary identity (RNTI) of the terminal or a public RNTI of a terminal group, where the target DCI is indicated by a specific RNTI to indicate DFI; or the target DCI is indicated by a third indicating field of the target DCI whether to indicate DFI.

In some embodiments, the third indicating field may be an existing indicating field, but in a case that the target DCI is used to indicate the DFI, the filling value of the third indicating field is a value not used for other indications; or the third indicating field is a newly added indicating field.

In other words, the RNTI for demodulating the target DCI may be a dedicated RNTI of the terminal, or may also be a public RNTI of a terminal group.

For the dedicated RNTI of the terminal, there are two cases: the existing RNTI is reused, a target field of the target DCI carriers the preset identity to indicate the target DCI for indicating the DFI; or a new RNTI is defined, and the target DCI is indicated by the specific RNTI for indicating the DFI.

The public RNTI of the terminal group includes: a new RNTI is defined, and the target DCI is indicated by the specific RNTI for indicating the DFI.

It should be noted that in a case that the new RNTI is defined (that is, the target DCI is indicated by the specific RNTI for indicating the DFI), the size of the target DCI is aligned with the size of the DCI for indicating other information except the DFI. In other words, the size of the target DCI is aligned with the size of the existing DCI, for example, when the size of the DCI is small, alignment may be realized by filling 0 bit.

In conclusion, in some embodiments of the present disclosure, the target DCI indicates the DFI, the DFI includes the control information blocks respectively corresponding to each carrier of K terminals, and the control information blocks include the HARQ-ACK feedbacks of the corresponding carriers, so that one DFI may include a plurality of HARQ-ACK feedbacks, the channel access opportunities are fully used, and the overhead of the control signaling is saved.

In order to better describe the above methods provided by some embodiments of the present disclosure, description is performed below with reference to several examples.

Example 1

DFI is dedicated to the terminal, the current CS_RNTI (Configured Scheduling RNTI) is reused to scramble the DFI, the DFI is less than or equal to the DCI format 0_0/0_1/1_0/1_1 of the search space of the carrier, and 0 is filled for alignment.

The DFI is identified by some current specific fields, such as an HARQ process number, a redundancy version, a modulating and coding strategy, frequency domain resource allocation, and other combined identities, and the combined identity is not used for existing indication.

X is fixed to be 1 (that is, DFI includes control information blocks respectively corresponding to a plurality of carriers of one terminal), the number N of the carriers is fixed by a protocol, and N≥1. The bit number of the HARQ-ACK fed back by the DFI is fixed to be 1*N*Z, and the size of the DFI is fixed. The dedicated RRC configuration information of the terminal includes a group of lists, each element of the list is a group {serveringCellID (carrier ID), positionInDFI (the position of the HARQ-ACK feedback in the DFI)}. Each control information block uses 1 bit to indicate whether the HARQ-ACK feedback of a certain carrier is valid.

The terminal performs blind detection on DFI in the terminal-dedicated search space of the carrier identified by the mapping element included in the RRC configuration information.

Example 2

DFI is dedicated to the terminal, the current CS_RNTI (Configured Scheduling RNTI) is reused to scramble the DFI, the DFI is less than or equal to the DCI format 0_0/0_1/1_0/1_1 of the search space of the carrier, and 0 is filled for alignment.

X is fixed to be 1 (that is, DFI includes control information blocks respectively corresponding to a plurality of carriers of one terminal), the number N of the carriers is fixed by a protocol, and N≥1. The bit number of the HARQ-ACK fed back by the DFI is fixed to be 1*N*Z, and the size of the DFI is fixed.

The RRC configuration information of the terminal includes a {firstserveringCellID (first carrier ID), positionInDFI (the position of the HARQ-ACK feedback in the DFI)}. The ID of the subsequence carriers may be deduced from the first and the sum. Each control information block uses 1 bit to indicate whether the HARQ-ACK feedback of a certain carrier is valid.

The terminal performs blind detection on DFI in the terminal-dedicated search space of the carrier identified by the mapping element included in the RRC configuration information.

Example 3

DFI is dedicated to the terminal, the current CS_RNTI (Configured Scheduling RNTI) is reused to scramble the DFI, the DFI is less than or equal to the DCI format 0_0/0_1/1_0/1_1 of the search space of the carrier, and 0 is filled for alignment.

The DFI is identified by some current specific fields, such as an HARQ process number, a redundancy version, a modulating and coding strategy, frequency domain resource allocation, and other combined identities, and the combined identity is not used for existing indication.

X is fixed to be 1 (that is, DFI includes control information blocks respectively corresponding to a plurality of carriers of one terminal), the number N of the carriers is fixed by a protocol, and N≥1. The bit number of the HARQ-ACK fed back by the DFI is fixed to be 1*N*Z, and the size of the DFI is fixed.

In each control information block, the position of the carrier is indicated through CIF, the number M_N*(CIF size+HARQ-ACK size per carrier) of the carriers is a valid bit, and M_N is dynamically indicated in the DCI.

The terminal performs blind detection in the terminal-dedicated search space of the scheduled carrier.

Example 4

DFI is dedicated to the terminal, the current CS_RNTI (Configured Scheduling RNTI) is reused to scramble the DFI, the DFI is less than or equal to the DCI format 0_0/0_1/1_0/1_1 of the search space of the carrier, and 0 is filled for alignment.

X is fixed to be 1 (that is, DFI includes control information blocks respectively corresponding to a plurality of carriers of one terminal), the number N of the carriers is fixed by a protocol, and N≥1. The bit number of the HARQ-ACK fed back by the DFI is fixed to be 1*N*Z, and the size of the DFI is fixed.

An arrangement is performed according to (CIF #1, HARQ-ACK for CIF #1), (CIF #2, HARQ-ACK for CIF #2) . . . . In a case that a certain carrier does not have the HARQ-ACK feedback, the HARQ-ACK of other carriers is repeatedly indicated.

The terminal performs blind detection in the terminal-dedicated search space of the scheduled carrier.

Example 5

DFI is common to a terminal group, a new RNTI is defined, the DFI is less than or equal to the DCI format 2_0 of the search space of the carrier, and 0 is filled for alignment.

X is fixed by a protocol, X≥1 (that is, the DFI includes control information blocks respectively corresponding to a plurality of carriers of at least one terminal), the number M_N of the carriers of UE_M is fixed by a protocol, and M_N≥1. The bit number of the HARQ-ACK fed back by the DFI is fixed to $\Sigma_0^X i_N * Z$ be the number of the terminals, $i_N$ is the number of the carriers of the $N^{th}$ terminal, and Z is the fixed HARQ-ACK feedback size. The size of the DFI is fixed.

The RRC configuration information of the terminal includes a group of lists, each element of the list is a group {serveringCellID (carrier ID), positionInDFI (the position of the HARQ-ACK feedback in the DFI)}. Each control information block uses 1 bit to indicate whether the HARQ-ACK feedback of a certain carrier is valid.

The terminal performs blind detection on DFI in the search space common to the terminal group of the carrier identified by the mapping element included in the RRC configuration information.

Example 6

DFI is common to a terminal group, a new RNTI is defined, the DFI is less than or equal to the DCI format 2_0 of the search space of the carrier, and 0 is filled for alignment.

X is fixed by a protocol, X≥1 (that is, the DFI includes control information blocks respectively corresponding to a plurality of carriers of at least one terminal), the number M_N of the carriers of UE_M is fixed by a protocol, and M_N≥1. The bit number of the HARQ-ACK fed back by the DFI is fixed to $\Sigma_0^X i_N * Z$ be the number of the terminals, $i_N$ is the number of the carriers of the $N^{th}$ terminal, and Z is the fixed HARQ-ACK feedback size. The size of the DFI is fixed.

The RRC configuration information of the terminal includes a {firstserveringCellID (first carrier ID), positionInDFI (the position of the HARQ-ACK feedback in the DFI)}. The ID of the subsequence carriers may be deduced from the first and the sum. Each control information block uses 1 bit to indicate whether the HARQ-ACK feedback of a certain carrier is valid.

The terminal performs blind detection on DFI in the search space common to the terminal group of the carrier identified by the mapping element included in the RRC configuration information.

Figure 4:
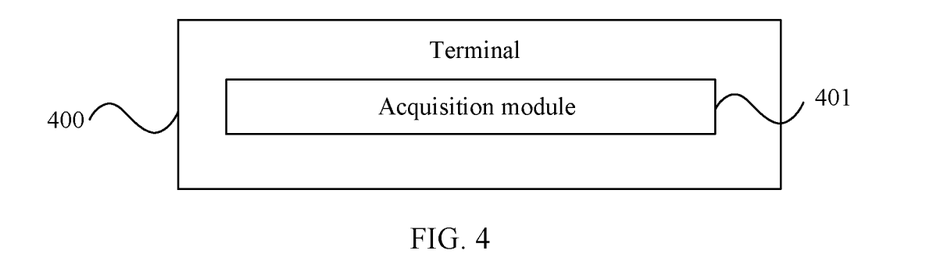
FIG. 4 is a first structural schematic diagram of a terminal according to some embodiments of the present disclosure.

As shown in FIG. 4, some embodiments of the present disclosure further provide a terminal 400, including:

an acquisition module 401, configured to acquire target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

In the above embodiments of the present disclosure, the terminal may further include:

a position acquisition module, configured to acquire radio resource control (RRC) configuration information, where the RRC configuration information is used to indicate the position of the HARQ-ACK of at least one carrier in the DFI.

In the above embodiments of the present disclosure, the RRC configuration information may include:

a plurality of mapping elements, each mapping element including: a carrier ID, and a position of the HARQ-ACK feedback of a carrier identified by the carrier ID in the DFI; or a mapping element, the mapping element including: an ID of a first carrier of carrier aggregation, and a position of the HARQ-ACK feedback of the first carrier in the DFI.

In the above embodiments of the present disclosure, the acquisition module may include:

a carrier determination submodule, configured to, according to the RRC configuration information, determine the carrier of the terminal with the HARQ-ACK feedback indicated by the RRC configuration information; and a first blind detection submodule, configured to perform blind detection on the target DCI in the search space of the determined carrier.

In the above embodiments of the present disclosure, the control information block may include a carrier indicator field (CIF), where the CIF is used to indicate an ID of the carrier corresponding to the control information block.

In the above embodiments of the present disclosure, the acquisition module may include: a second blind detection submodule, configured to perform blind detection on the target DCI in the search space of the scheduled carrier.

In the above embodiments of the present disclosure, the control information block may further include:

a first indicating field, used to indicate whether the HARQ-ACK feedback of the carrier included in the control information block is valid.

In the above embodiments of the present disclosure, in a case that the first carrier does not have the HARQ-ACK feedback, the control information block of the first carrier may be used to carry HARQ-ACK feedbacks of other carriers.

In the above embodiments of the present disclosure, the DFI may further include:

a second indicating field, used to indicate the number of the carriers with the HARQ-ACK feedbacks.

The terminal further includes:

a determination module, configured to, according to the number of carriers indicated by the second indicating field, CIF size in the DFI and HARQ-ACK size per carrier, determine the valid bit number of the HARQ-ACK feedback in the DFI; and a first demodulation module, configured to demodulate the HARQ-ACK feedback of the carrier within the valid bit number of the DFI.

In the above embodiments of the present disclosure, the control information block may further include: transmit power control (TPC) of the carrier.

In the above embodiments of the present disclosure, the terminal may further include:

a second demodulation module, configured to demodulate the target DCI by a dedicated radio network temporary identity (RNTI) of the terminal or a public RNTI of a terminal group, where the target DCI is indicated by a specific RNTI to indicate DFI; or the target DCI is indicated by a third indicating field of the target DCI whether to indicate DFI.

In the above embodiments of the present disclosure, the size of the target DCI may be aligned with the size of DCI for indicating other information except for the DFI.

The terminal provided in some embodiments of the present disclosure can implement the processes performed by the terminal in the method embodiment in FIG. 2. To avoid repetition, details are not described herein again.

In conclusion, in some embodiments of the present disclosure, the target DCI indicates the DFI, the DFI includes the control information blocks respectively corresponding to each carrier of K terminals, and the control information blocks include the HARQ-ACK feedbacks of the corresponding carriers, so that one DFI may include a plurality of HARQ-ACK feedbacks, the channel access opportunities are fully used, and the overhead of the control signaling is saved.

It should be noted that the terminal provided by some embodiments of the present disclosure is a terminal capable of performing the acquisition method of the hybrid automatic repeat request acknowledgment (HARQ-ACK) feedback, all the embodiments of the acquisition method of the hybrid automatic repeat request acknowledgment (HARQ-ACK) feedback are applicable to the terminal, and a same or similar beneficial effect can be achieved.

Some embodiments of the present disclosure may further provide a terminal, including a processor, a memory, and a computer program stored in the memory and capable of running on the processor. When the computer program is executed by the processor, the processes of the acquisition method embodiment of the hybrid automatic repeat request acknowledgment (HARQ-ACK) feedback are implemented, and a same technical effect can be achieved. To avoid repetition, details are not provided herein again.

Some embodiments of the present disclosure further provide a non-transitory computer readable storage medium. The non-transitory computer readable storage medium stores a computer program, and when the computer program is executed by a processor, the processes of the acquisition method embodiment of the hybrid automatic repeat request acknowledgment (HARQ-ACK) feedback are implemented, and a same technical effect can be achieved. To avoid repetition, details are not described herein again. The non-transitory computer readable storage medium is, for example, a read-only memory (ROM), a random access memory (RAM), a magnetic disk, or an optical disk.

Figure 5:
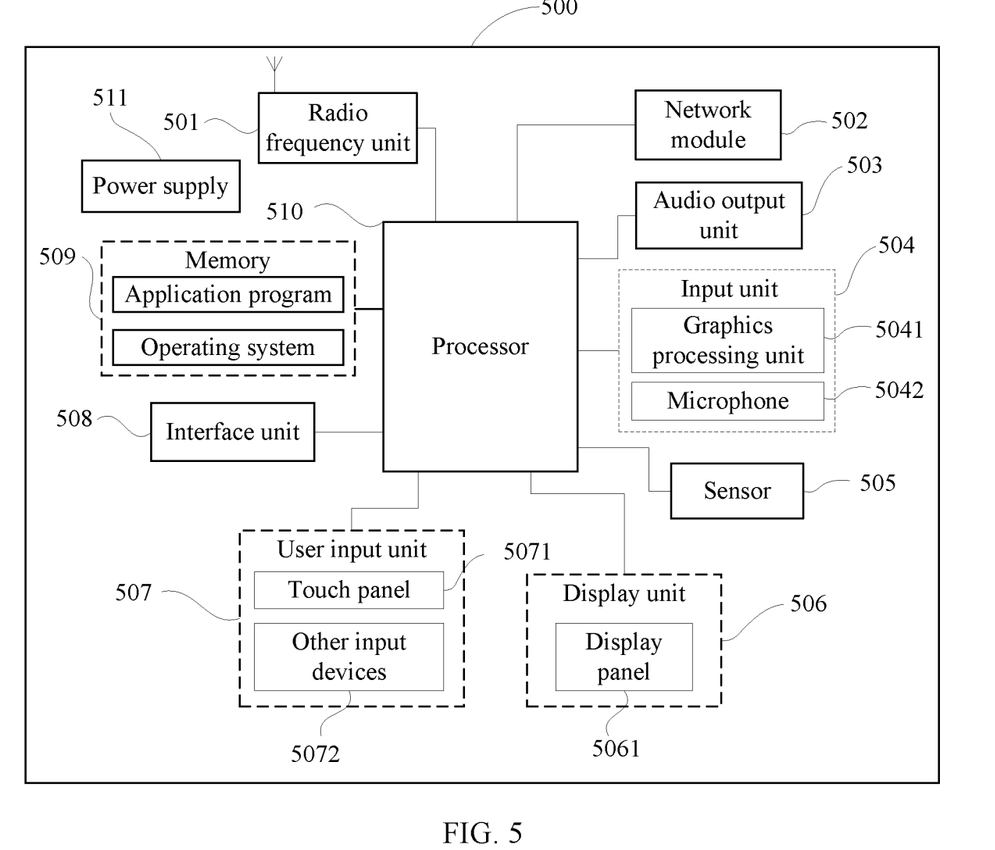
FIG. 5 is a second structural schematic diagram of a terminal according to some embodiments of the present disclosure.

FIG. 5 is a schematic structural diagram of hardware of a terminal implementing embodiments of the present disclosure. The terminal 500 includes but is not limited to: a radio frequency unit 501, a network module 502, an audio output unit 503, an input unit 504, a sensor 505, a display unit 506, a user input unit 507, an interface unit 508, a memory 509, a processor 510, a power supply 511, and other components. A person skilled in the art may understand that the structure of the terminal shown in FIG. 5 does not constitute a limitation on the terminal, and the terminal may include more or fewer components than those shown in the figure, or combine some components, or have different component arrangements. In some embodiments of the present disclosure, the terminal includes but is not limited to a mobile phone, a tablet computer, a notebook computer, a palmtop computer, an in-vehicle terminal, a wearable device, a pedometer, or the like.

A radio frequency unit 501 is configured to acquire target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

In conclusion, in some embodiments of the present disclosure, the target DCI indicates the DFI, the DFI includes the control information blocks respectively corresponding to each carrier of K terminals, and the control information blocks include the HARQ-ACK feedbacks of the corresponding carriers, so that one DFI may include a plurality of HARQ-ACK feedbacks, the channel access opportunities are fully used, and the overhead of the control signaling is saved.

It should be noted that the terminal provided by some embodiments of the present disclosure is a terminal capable of performing the acquisition method of the hybrid automatic repeat request acknowledgment (HARQ-ACK) feedback, all the embodiments of the acquisition method of the hybrid automatic repeat request acknowledgment (HARQ-ACK) feedback are applicable to the terminal, and a same or similar beneficial effect can be achieved.

It should be understood that, in some embodiments of the present disclosure, the radio frequency unit 501 may be configured to receive and send information or receive and send a signal in a call process. Specifically, after receiving downlink data from a base station, the radio frequency unit sends the downlink data to the processor 510 for processing. In addition, the radio frequency unit 501 sends uplink data to the base station. Generally, the radio frequency unit 501 includes but is not limited to: an antenna, at least one amplifier, a transceiver, a coupler, a low noise amplifier, a duplexer, or the like. In addition, the radio frequency unit 501 may further communicate with a network and another device by using a wireless communication system.

The terminal provides wireless broadband Internet access for a user by using the network module 502, for example, helps the user to send and receive an e-mail, browse a web page, and access streaming media.

The audio output unit 503 may convert audio data received by the radio frequency unit 501 or the network module 502 or stored in the memory 509 into an audio signal and output as voice. Moreover, the audio output unit 503 may further provide an audio output related to a specific function performed by the terminal 500 (such as a call signal reception sound, a message reception sound, or the like). The audio output unit 503 includes a speaker, a buzzer, a telephone receiver, or the like.

The input unit 504 is configured to receive an acoustic signal or a video signal. The input unit 504 may include a graphics processing unit (GPU) 5041 and a microphone 5042. The graphics processing unit 5041 is used to process image data of a static picture or a video obtained by an image capturing device (for example, a camera) in a video capturing mode or an image capturing mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process the sound into audio data. The processed audio data may be converted, in a call mode, into a format that may be sent to a mobile communication base station by using the radio frequency unit 501 for output.

The terminal 500 further includes at least one sensor 505, such as a light sensor, a motion sensor, and another sensor. Specifically, the light sensor includes an ambient light sensor and a proximity sensor. The ambient light sensor may adjust the luminance of the display panel 5061 based on the brightness of ambient light. The proximity sensor may turn off the display panel 5061 and/or backlight when the terminal 500 moves to an ear. As a type of motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), or the like. The sensor 505 may further include a fingerprint sensor, a pressure sensor, an iris sensor, a molecule sensor, a gyroscope, a barometer, a hygrometer, a thermometer, and an infrared sensor. Details are not described herein.

The display unit 506 is configured to display information entered by the user or information provided for the user. The display unit 506 may include the display panel 5061, and the display panel 5061 may be configured in a form of a liquid crystal display (LCD), an organic light-emitting diode (OLED), or the like.

A user input unit 507 may be configured to receive input digital or character information, and generate key signal input related to user setting and function control of a terminal. Specifically, the user input unit 507 includes a touch panel 5071 and other input devices 5072. The touch panel 5071, also called a touch screen, may collect touch operation on or near the touch panel by users (for example, operation on the touch panel 5071 or near the touch panel 5071 by fingers or any suitable objects or accessories such as a touch pen by the users). The touch panel 5071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 5071 may be implemented by various types, such as a resistive type, a capacitive type, an infrared type, a surface acoustic wave type, or the like. The user input unit 507 may further include other input devices 5072 in addition to the touch panel 5071. Specifically, the other input devices 5072 may include, but not limited to, a physical keyboard, function keys (such as a volume control key and a switch key), a trackball, a mouse, and a joystick. Details are not described herein.

Further, the touch panel 5071 can cover the display panel 5061. When detecting a touch operation on or near the touch panel, the touch panel 5071 transmits the touch operation to the processor 510 to determine a type of touch event. Then the processor 510 provides a corresponding visual output on the display panel 5061 based on the type of the touch event. Although in FIG. 5, the touch panel 5071 and the display panel 5061 are used as two independent components to implement input and output functions of the terminal, in some embodiments, the touch panel 5071 and the display panel 5061 may be integrated to implement the input and output functions of the mobile terminal. This is not specifically limited herein.

The interface unit 508 is an interface for connecting an external apparatus to the terminal 500. For example, the external device may include a wired or wireless headset jack, an external power supply (or a battery charger) port, a wired or wireless data port, a memory card port, a port for connecting a device having an identification module, an audio input/output (I/O) port, a video I/O port, and a headset jack. The interface unit 508 may be configured to receive input (for example, data information and power) from the external apparatus and transmit the received input to one or more elements in the terminal 500, or may be configured to transmit data between the terminal 500 and the external apparatus.

The memory 509 may be configured to store a software program and various data. The memory 509 may mainly include a program storage area and a data storage area. The program storage area may store an operating system, an application required by at least one function (for example, a sound play function or an image display function), or the like. The data storage area may store data (for example, audio data or an address book) or the like created based on the use of a mobile phone. In addition, the memory 509 may include a high-speed random access memory or a nonvolatile memory, for example, at least one disk storage device, a flash memory, or other volatile solid-state storage devices.

The processor 510 is a control center of the terminal, and connects all parts of the entire terminal through various interfaces and lines. By running or executing a software program and/or a module stored in the memory 509 and invoking data stored in the memory 509, the processor 510 performs various functions of the terminal and data processing, to perform overall monitoring on the terminal. The processor 510 may include one or more processing units. In some embodiments, the processor 510 may be integrated with an application processor and a modem processor. The application processor mainly processes an operating system, a user interface, an application program, or the like, and the modem processor mainly processes wireless communication. It may be understood that the modem processor may not be integrated into the processor 510.

The terminal 500 may further include the power supply 511 (for example, a battery) configured to supply power to various components. In some embodiments, the power supply 511 may be logically connected to the processor 510 through a power management system, so as to implement functions such as managing charging, discharging, and power consumption through the power management system.

In addition, the terminal 500 includes some function modules that are not shown, and details are not provided herein.

Figure 6:
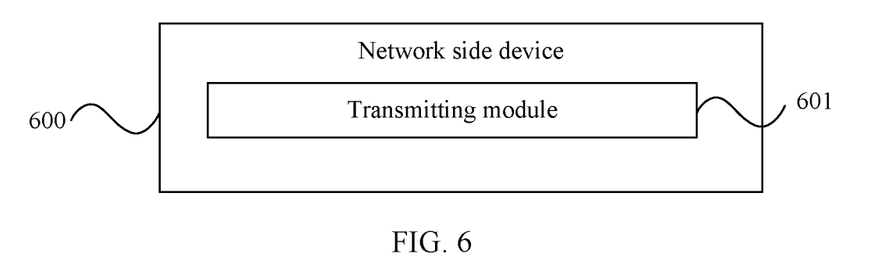
FIG. 6 is a first structural schematic diagram of a network side device according to some embodiments of the present disclosure.

As shown in FIG. 6, some embodiments of the present disclosure further provide a network side device 600, including:

a transmitting module 601, configured to transmit target downlink control information (DCI), where the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

In the above embodiments of the present disclosure, the network side device may further include:

a position transmitting module, configured to transmit radio resource control (RRC) configuration information, where the RRC configuration information is used to indicate the position of the HARQ-ACK of at least one carrier in the DFI.

In the above embodiments of the present disclosure, the RRC configuration information may include:

a plurality of mapping elements, each mapping element including: a carrier ID, and a position of the HARQ-ACK feedback of a carrier identified by the carrier ID in the DFI; or a mapping element, the mapping element including: an ID of a first carrier of carrier aggregation, and a position of the HARQ-ACK feedback of the first carrier in the DFI.

In the above embodiments of the present disclosure, the control information block may include a carrier indicator field (CIF), where the CIF is used to indicate an ID of the carrier corresponding to the control information block.

In the above embodiments of the present disclosure, the control information block may further include:

a first indicating field, used to indicate whether the HARQ-ACK feedback of the carrier included in the control information block is valid.

In the above embodiments of the present disclosure, in a case that the first carrier does not have the HARQ-ACK feedback, the control information block of the first carrier may be used to carry HARQ-ACK feedbacks of other carriers.

In the above embodiments of the present disclosure, the DFI may further include:

a second indicating field, used to indicate the number of the carriers with the HARQ-ACK feedbacks.

In the above embodiments of the present disclosure, the control information block may further include: transmit power control (TPC) of the carrier.

In the above embodiments of the present disclosure, the transmitting module may include:

a transmitting submodule, configured to scramble and transmit the target DCI by a dedicated radio network temporary identity (RNTI) of the terminal or a public RNTI of a terminal group, where the target DCI is indicated by a specific RNTI to indicate DFI; or the target DCI is indicated by a third indicating field of the target DCI whether to indicate DFI.

In the above embodiments of the present disclosure, the size of the target DCI may be aligned with the size of DCI for indicating other information except for the DFI.

The network side device provided by some embodiments of the present disclosure can implement the processes implemented by the network side device in the method embodiment of FIG. 3. To avoid repetition, details are not described herein again.

In conclusion, in some embodiments of the present disclosure, the target DCI indicates the DFI, the DFI includes the control information blocks respectively corresponding to each carrier of K terminals, and the control information blocks include the HARQ-ACK feedbacks of the corresponding carriers, so that one DFI may include a plurality of HARQ-ACK feedbacks, the channel access opportunities are fully used, and the overhead of the control signaling is saved.

It should be noted that the network side device provided by some embodiments of the present disclosure is a network side device capable of performing the transmission method of the hybrid automatic repeat request acknowledgment (HARQ-ACK) feedback, all the embodiments of the transmission method of the hybrid automatic repeat request acknowledgment (HARQ-ACK) feedback are applicable to the network side device, and a same or similar beneficial effect can be achieved.

Some embodiments of the present disclosure may further provide a terminal, including a processor, a memory, and a computer program stored in the memory and capable of running on the processor. When the computer program is executed by the processor, the processes of the transmission method embodiment of the hybrid automatic repeat request acknowledgment (HARQ-ACK) feedback are implemented, and a same technical effect can be achieved. To avoid repetition, details are not provided herein again.

Some embodiments of the present disclosure further provide a non-transitory computer readable storage medium. The non-transitory computer readable storage medium stores a computer program. When the computer program is executed by a processor, the processes of the transmission method embodiment of the hybrid automatic repeat request acknowledgement (HARQ-ACK) feedback are implemented, and a same technical effect can be achieved. To avoid repetition, details are not provided herein again. The computer-readable storage medium includes a read-only memory (ROM), a random access memory (RAM), a magnetic disk, or an optical disc.

Figure 7:
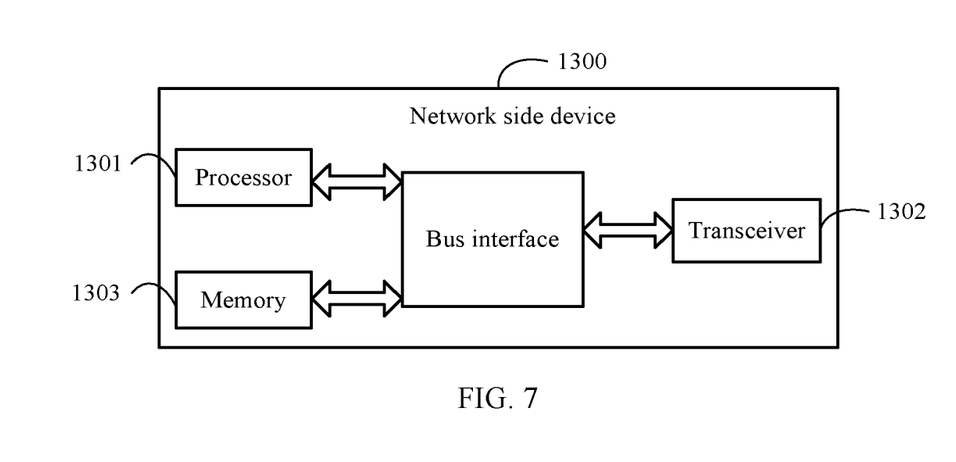
FIG. 7 is a second structural schematic diagram of a network side device according to some embodiments of the present disclosure.

FIG. 7 is a structural diagram of a network side device according an embodiment of the present disclosure, details of the information receiving method cam be realized, and a same effect can be achieved. As shown in FIG. 7, the network side device 1300 includes: a processor 1301, a transceiver 1302, a memory 1303, and a bus interface.

The processor 1301 is configured to read a program in the memory 1303, to perform the following processes:

transmitting target downlink control information (DCI), the target DCI is used to indicate downlink feedback information (DFI), the DFI includes control information blocks respectively corresponding to N carriers of K terminals, the control information blocks include HARQ-ACK feedbacks of the corresponding carriers, and K and N are integers greater than or equal to 1.

In conclusion, in some embodiments of the present disclosure, the target DCI indicates the DFI, the DFI includes the control information blocks respectively corresponding to each carrier of K terminals, and the control information blocks include the HARQ-ACK feedbacks of the corresponding carriers, so that one DFI may include a plurality of HARQ-ACK feedbacks, the channel access opportunities are fully used, and the overhead of the control signaling is saved.

It should be noted that the network side device provided by some embodiments of the present disclosure is a network side device capable of performing the transmission method of the hybrid automatic repeat request acknowledgment (HARQ-ACK) feedback, all the embodiments of the transmission method of the hybrid automatic repeat request acknowledgment (HARQ-ACK) feedback are applicable to the network side device, and a same or similar beneficial effect can be achieved.

In FIG. 7, the bus architecture may include any number of interconnected buses and bridges, which are specifically linked together by various circuits of one or more processors represented by the processor 1301 and a memory represented by the memory 1303. The bus architecture may further link various other circuits such as those of a peripheral device, a voltage regulator, and a power management circuit. These are well known in the art, and therefore are not further described in this specification. The bus interface provides an interface. The transceiver 1302 may be a plurality of elements, in other words, include a transmitter and a receiver, and provide a unit for communicating with various other devices on a transmission medium.

It should be noted that in this specification, terms "include", "comprise" or any other variants thereof are intended to cover non-exclusive inclusion, so that a process, a method, an article, or an apparatus that includes a series of elements not only includes those elements, but also includes other elements that are not explicitly listed, or includes inherent elements of the process, method, article, or apparatus. An element limited by "includes a . . . " does not, without more constraints, preclude the presence of additional identical elements in the process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on the understanding, the technical solutions of the present disclosure essentially or the part that contributes to the prior art may be embodied in the form of software products. The computer software product is stored in a storage medium (such as ROM/RAM, a magnetic disk, and an optical disk), including several instructions for enabling one terminal (which may be a mobile phone, a computer, a server, or a network device) to implement the method in each embodiment of the present disclosure.

It can be understood that these embodiments described in some embodiments of the present disclosure may be implemented by hardware, software, firmware, middleware, microcode, or a combination thereof. For implementation with hardware, the module, unit, and subunit may be implemented in one or more application specific integrated circuits (ASIC), a digital signal processor (DSP), a DSP device (DSPD), a programmable logic device (PLD), a field-programmable gate array (FPGA), general processors, controllers, micro-controllers, micro-processors, and other electronic units for implementing the functions of the present application, or their combinations.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. An acquisition method of a Hybrid Automatic Repeat Request ACKnowledgment (HARQ-ACK) feedback, performed by a terminal, wherein the method comprises:
   acquiring target Downlink Control Information (DCI), wherein the target DCI is used to indicate Downlink Feedback Information (DFI), the DFI comprises control information blocks respectively corresponding to N carriers of K terminals and a first indicating field configured to indicate a number of carriers with the HARQ-ACK feedback, wherein each control information block comprises:
      the HARQ-ACK feedback of a corresponding carrier of the N carriers, and K is an integer greater than 1 and N is an integer greater than or equal to 1; and
      a Carrier Indicator Field (CIF), configured to indicate an identifier (ID) of a carrier corresponding to the control information block,
   the method further comprising:
   according to the number of carriers indicated by the first indicating field, CIF size in the DFI, and HARQ-ACK size per carrier, determining a total number of bits occupied by the control information blocks in the DFI; and
   demodulating the HARQ-ACK feedback of the carrier within the total number of bits occupied by the control information blocks in the DFI.

2. The method according to claim 1, wherein before acquiring the target DCI, the method further comprises:
   acquiring Radio Resource Control (RRC) configuration information, wherein the RRC configuration information is used to indicate a position of the HARQ-ACK of at least one carrier in the DFI.

3. The method according to claim 2, wherein the RRC configuration information comprises:
   a plurality of mapping elements, each mapping element comprising: a carrier identifier (ID), and a position of the HARQ-ACK feedback of a carrier identified by the carrier ID in the DFI; or
   a mapping element, comprising: an ID of a first carrier of carrier aggregation, and a position of the HARQ-ACK feedback of the first carrier in the DFI.

4. The method according to claim 3, wherein the step of acquiring the target DCI comprises:
   determining a carrier identified by the mapping element included in the RRC configuration information; and
   performing blind detection on the target DCI in a search space of the identified carrier.

5. The method according to claim 1, wherein the control information block further comprises:

a second indicating field, used to indicate whether the control information block carries the HARQ-ACK feedback of the carrier.

6. The method according to claim 1, wherein in response to determining that a first carrier does not have the HARQ-ACK feedback, the control information block of the first carrier is used to carry HARQ-ACK feedbacks of other carriers.

7. The method according to claim 1, wherein each control information block further comprises: Transmit Power Control (TPC) of each carrier.

8. The method according to claim 1, further comprising:
demodulating the target DCI by a dedicated Radio Network Temporary Identity (RNTI) of the terminal or a public RNTI of a terminal group,
wherein the target DCI is indicated by a specific RNTI to indicate DFI; or the target DCI is indicated by a third indicating field of the target DCI whether to indicate DFI.

9. The method according to claim 1, wherein a size of the target DCI is made equal to a size of DCI for indicating information other than the DFI.

10. A transmission method of a hybrid Automatic Repeat Request ACKnowledgment (HARQ-ACK) feedback, performed by a network side device, wherein the method comprises:
transmitting target Downlink Control Information (DCI),
wherein the target DCI is used to indicate Downlink Feedback Information (DFI), the DFI comprises control information blocks respectively corresponding to N carriers of K terminals and a first indicating field configured to indicate a number of carriers with the HARQ-ACK feedback, wherein each control information block comprises:
the HARQ-ACK feedback of a corresponding carrier of the N carriers, and K is an integer greater than 1 and N is an integer greater than or equal to 1; and
a Carrier Indicator Field (CIF), configured to indicate an identifier (ID) of a carrier corresponding to the control information block,
wherein the number of carriers indicated by the first indicating field, CIF size in the DFI, and HARQ-ACK size per carrier are used by a terminal to:
determine a total number of bits occupied by the control information blocks in the DFI; and
demodulate the HARQ-ACK feedback of the carrier within the total number of bits occupied by the control information blocks in the DFI.

11. The method according to claim 10, wherein before transmitting the target DCI, the method further comprises:
transmitting Radio Resource Control (RRC) configuration information, wherein the RRC configuration information is used to indicate a position of the HARQ-ACK of at least one carrier in the DFI.

12. The method according to claim 11, wherein the RRC configuration information comprises:

a plurality of mapping elements, each mapping element comprising: a carrier identifier (ID), and a position of the HARQ-ACK feedback of a carrier identified by the carrier ID in the DFI;
of
a mapping element, comprising: an ID of a first carrier of carrier aggregation, and a position of the HARQ-ACK feedback of the first carrier in the DFI.

13. The method according to claim 10, wherein the control information block further comprises:
a second indicating field, used to indicate whether the control information block carries the HARQ-ACK feedback of the carrier.

14. The method according to claim 10, wherein in response to determining that the first carrier does not have the HARQ-ACK feedback, the control information block of the first carrier is used to carry HARQ-ACK feedbacks of other carriers.

15. The method according to claim 10, wherein the step of transmitting the target DCI comprises:
scrambling and transmitting the target DCI by a dedicated Radio Network Temporary Identity (RNTI) of a terminal or a public RNTI of a terminal group,
wherein the target DCI is indicated by a specific RNTI to indicate DFI; or the target DCI is indicated by a third indicating field of the target DCI whether to indicate DFI.

16. A terminal, comprising: a processor, a memory, and a computer program stored in the memory, wherein the computer program, when executed by the processor, causes the processor to perform an acquisition method of a Hybrid Automatic Repeat Request ACKnowledgment (HARQ-ACK) feedback, the method comprising:
wherein the target DCI is used to indicate Downlink Feedback Information (DFI), the DFI comprises control information blocks respectively corresponding to N carriers of K terminals and a first indicating field configured to indicate a number of carriers with the HARQ-ACK feedback, wherein each control information block comprises:
the HARQ-ACK feedback of a corresponding carrier of the N carriers, and K is an integer greater than 1 and N is an integer greater than or equal to 1; and
a Carrier Indicator Field (CIF), configured to indicate an identifier (ID) of a carrier corresponding to the control information block,
the method further comprising:
according to the number of carriers indicated by the first indicating field, CIF size in the DFI, and HARQ-ACK size per carrier, determining a total number of bits occupied by the control information blocks in the DFI; and
demodulating the HARQ-ACK feedback of the carrier within the total number of bits occupied by the control information blocks in the DFI.

* * * * *